R. Crichton,
Making Bolts,
Nº 12,815. Patented May. 8, 1855.

UNITED STATES PATENT OFFICE.

ROBERT CRICHTON, OF BUCHANAN P. O., PENNSYLVANIA.

MACHINE FOR MAKING BOLTS.

Specification of Letters Patent No. 12,815, dated May 8, 1855.

*To all whom it may concern:*

Be it known that I, ROBERT CRICHTON, of Buchanan, in the county of Allegheny and State of Pennsylvania, have invented certain new and useful Improvements in Machines for Making Bolts; and I do hereby declare that the following is a full, clear, and exact description of the construction and operation of the same, reference being had to the accompanying drawings, making a part of this specification, in which—

Figure 1:
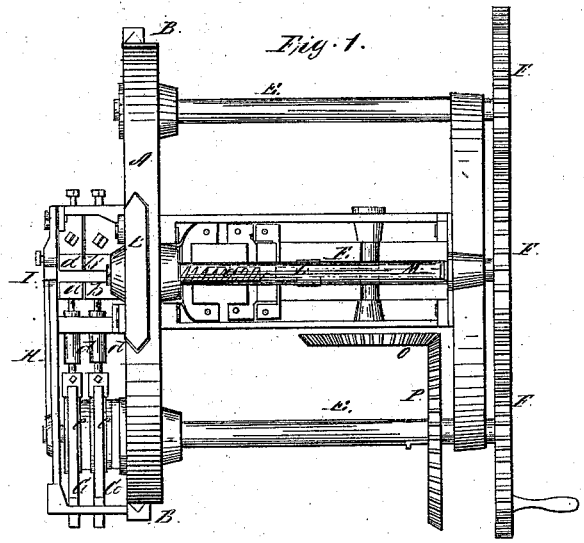
Figure 2:
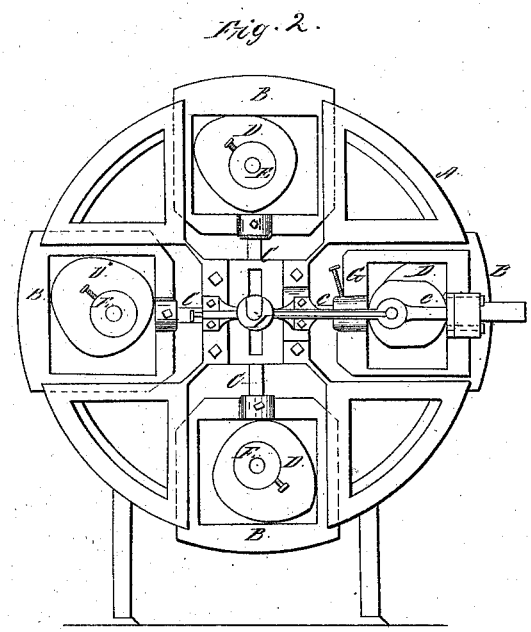
Figure 3:
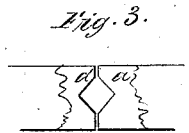
Figure 5:
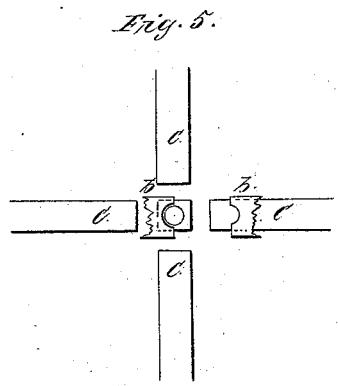
Figure 4:
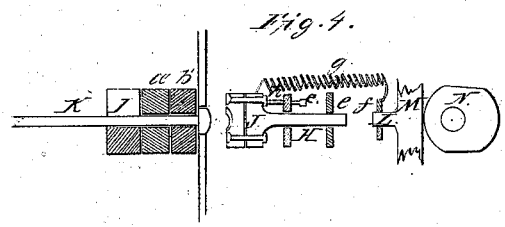

Figure 1, is a plan or top view of the machine. Fig. 2, is a face view of the circular frame in which the lateral heading dies or tools work. Fig. 3, is a detached view of the holding jaws. Fig. 4, is a section, showing the manner in which the head of the bolt is formed. Fig. 5, is a view, showing the operation of the lateral heading dies, and also the operation of the jaws which form the body of the bolt.

Similar letters of reference indicate corresponding parts, in each of the several figures.

To enable those skilled in the art to make and use my invention, I will proceed to describe its construction and operation.

A, is a circular frame, in which are placed four smaller frames or sashes, B, B, B, B; said sashes working in or between grooves in the circular frame, A, and in a direction at right angles to each other. To the inner ends of the sashes, B, are affixed the heading tools or dies, C; a heading tool to each sash; see Fig. 2. Within each sash, there is a cam, D; these cams are placed on shafts, E; and on the ends of the shafts, E, opposite to where the cams are attached, are toothed wheels, F, which gear into each other; see Fig. 1.

On the outer surface of the circular frame, A, the forming and holding jaws are placed; see Fig. 1. The holding jaws are denoted by, (*a*), (*a′*); and the forming jaws by, (*b*), (*b′*). The jaws, (*a′*), (*b′*), are stationary; but the jaws, (*a*), and, (*b*), are movable, and are operated by cams, (*c*), (*c*), which work within sashes, G, G; the jaws, (*a*), (*b*), being attached to the sashes, G, G, by rods, (*d*), (*d*). It will be seen that one holding and one forming jaw is stationary, and placed side by side; and that the remaining two jaws are movable, and work simultaneously side by side. The jaws are held in a suitable frame, H, attached to the face of the circular frame, A.

I, is a rest, in which the bar is placed for the jaws to act upon and form the bolt.

Directly back of the circular frame, A, and at its center, there is a horizontal heading die or tool, J, shown in Fig. 4. This die, J, is attached to the end of a shaft, K, which works in proper bearings, (*e*), (*e*). Behind the shaft, K, there is another horizontal shaft, L, working in suitable bearings; one of which bearings, (*f*), is shown in Fig. 4. The shaft, L, is attached to a sash, M, which has within it a cam, N; the said cam, N, and a portion of the sash, M, are shown in Fig. 4; and the top of the sash is shown in red in Fig. 1. The cam, N, is operated by means of the bevel wheels, O, P, seen in Fig. 1; the wheel P, being upon one of the shafts, E, before described.

Operation: The bar, R, is placed in the rest, I, and the end of it is shoved forward until it touches the horizontal heading die, J. The toothed wheels, F, are then turned; power being applied to either one of them; and the two jaws, (*a*), (*b*), are moved forward against the stationary jaws, (*a′*), (*b′*). The jaws, (*a*), (*a′*), hold the bar firmly, and prevent it from moving; they perform no other office. The jaws, (*b*), (*b′*), give the end of the bar the proper form for the body of the bolt. When the jaws, (*a*), (*b*), and (*a′*), (*b′*), come together, the horizontal heading die, J, is moved or forced toward the circular frame, A, by means of the cam, N, which, as it revolves, forces the shaft, L, forward, and against the end of the shaft, K. The die, J, flattens the end of the bar, R, against the inner side of the forming dies, (*b*), (*b′*), and forms a rude head; the four lateral heading dies, C, then move simultaneously toward the head and perfect its shape, forming it into a perfect square; a die, C, bearing against each side. A correct idea of the forming of the head will be obtained by referring to Figs. 4 and 5. The horizontal heading die, J, and the lateral heading dies, C, and the jaws, then move back to their original position; the bolt is taken out; and the machine is again ready for another feed.

The die, J, is drawn back by means of a spiral spring, (*g*); the spring acting upon it when the shaft, L, is drawn back, by the cam, N. The die, J, is prevented from being drawn too far back, by a stop, (*h*), attached to one of the bearings, (*e*), as shown in Fig. 4.

I prefer to have the holding jaws, (a), (a'), formed with, V, recesses, in their face sides, as shown in Fig. 3. By this means, the same jaws will hold different sized bars.

The foregoing described machine is perfectly simple, not liable to get out of repair, and works well, practically. The holding jaws prevent the bolts from being bruised as they grasp the cold portion of the bar; the end of the bar, where the bolt is to be formed, being heated previous to its insertion in the machine.

I do not claim the adjustable shaft L, the detached shaft K, the spring g, or the stop h these having been known and used separately before; but I do claim—

The combination of the adjustable shaft L, the detached shaft K, the spring g and stop h, with the sash M and horizontal heading tool J to regulate the quantity of iron in and thickness of head as herein shown and described.

ROBERT CRICHTON.

Witnesses:
HENRY McCINLER,
R. HOLMES.